July 19, 1955

S. GRUBMAN 2,713,655

SELENIUM RECTIFIER

Filed Jan. 4, 1951

*INVENTOR.*
STANLEY GRUBMAN
BY
*Harry M. Saragovitz*
*Attorney*

United States Patent Office 2,713,655
Patented July 19, 1955

2,713,655
SELENIUM RECTIFIER

Stanley Grubman, Long Branch, N. J.

Application January 4, 1951, Serial No. 204,455

15 Claims. (Cl. 317—234)

(Granted under Title 35, U. S. Code (1952), sec. 266)

The invention described herein may be manufactured and used by or for the Government for governmental purposes, without the payment to me of any royalty thereon.

The subject invention applies to metallic rectifiers, and more particularly to rectifiers consisting of stacked or spaced plates, wherein the current capacity of the rectifier is a function of the heat dissipating characteristic of the plates.

The presently used metallic rectifiers comprise a number of metallic plates, usually stacked in series with one surface of each plate coated with selenium or other compound that will produce a rectifying action. The amount of current that can be carried by the rectifier will depend mainly on the area of coated surface, as an electrical resistance factor, and the surface area of the plates exposed to the air, as a heat dissipation factor.

It is therefore an object of this invention to provide a rectifier having an increased current carrying capacity for a given envelope dimension.

It is a further object of this invention to provide a simple means of increasing the current carrying capacity of a given size rectifier.

It is a further object of this invention to provide a means of increasing the current carrying capacity of a given rectifier by increasing the heat dissipation of the rectifier of a given size.

These and other objects of this invention will become apparent from the following specification.

Figure 1:
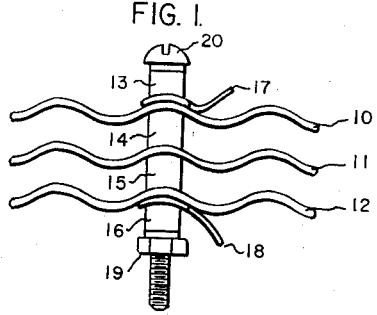
Figs. 1, 2 and 3 show views of a first embodiment of the invention.

Referring now specifically to Fig. 1, a sectional view of a typical stacked-plate metallic rectifier is shown. This view is made with the plates perpendicular to the paper. The plates 10, 11, 12 are seen mounted between spacers 13, 14, 15 and 16. Terminals 17 and 18 are in contact with the outer surfaces of the last two plates to provide the electrical contacts for the rectifier. A nut 19 and bolt 20, insulated from the electrical elements of the rectifier, may be provided to support the elements of the stack in close contact and to provide a means for mounting the rectifier.

The actual plates 10, 11 and 12 in this rectifier have been corrugated to give a greater surface of coated material and a correspondingly greater surface in contact with the air for heat dissipation. These corrugations may be as great as can be physically confined in the prescribed space. It is clear from this drawing that since the corrugations of the successive layers can be symmetrical, they can follow each other's contours, and the space that can be utilized by the corrugations can be greater than the actual distance between plates without substantially changing this physical distance.

It should be noted here that there would be a practical limit to the number and shape of corrugation where the spacing between plates would be considerably decreased by the corrugation and the increase in effective plate surface would not have a sufficient increase in actual heat dissipation to be warranted.

This system would have the added advantage of giving a greater plate strength for a given plate thickness. This would permit the use of thinner gage plate, with a resulting decrease in weight without decreasing the physical strength of the rectifier.

The plates to be used in this rectifier can be of any desired shape although the conventional shape would be a square or rectangle. It is also apparent that the number and shape of corrugations are not limited to that shown in the species of Fig. 1.

Figure 2:
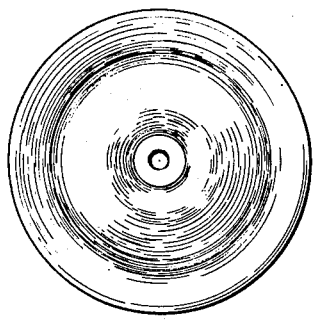

Fig. 2 shows a top view of another form of this invention, where a circular shape is chosen, and the corrugations are circular. The spacers can be flat and the section of the rectifier about the center can also be flat to simplify the manufacture of spacers. A curved spacer such as seen in Fig. 1 would probably have to be molded to fit the corrugation of the plates. This might be desirable in the species of Fig. 1 to prevent rotation of the plates and possibility of closing off of the air passages, but is not necessary in the configurations of Figs. 2 and 3.

Figure 3:
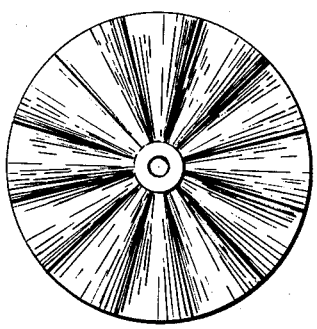

Fig. 3 shows the use of a circular plate that is corrugated radially to permit a flow of air through the plates equally well in any direction parallel to the plates.

The corrugations need not be symmetrically placed. By using the corrugated plates described here, the spacing between plates can be maintained by the plates themselves, either by alternating the direction of corrugation of successive plates or interleaving corrugated and flat plates. In this case the spacing between plates—which is a function of the spacer—is simply and effectively accomplished by the amount of corrugation, without materially decreasing the metallic surface exposed to air for heat dissipation. The contact between the coated surface and the back of the following plate is well maintained along each corrugation. The species would cut the number of elements needed in final assembly and should, correspondingly, cut the cost of manufacture.

Figure 4:
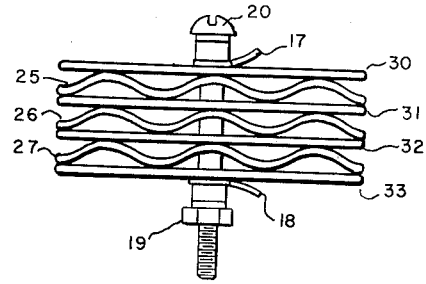
Figs. 4 and 5 show views of a second embodiment of the invention.

Fig. 4 shows an embodiment of a species of this invention where the corrugated plates 25, 26 and 27 are interleaved with, or interleave, flat plates 30, 31, 32 and 33. Both sets of plates have coatings on one side with approximately the same area, and, in this species, no spacers are needed, since the corrugated members determine the interval as well as supplying their own contact with the succeeding plates.

Figure 5:
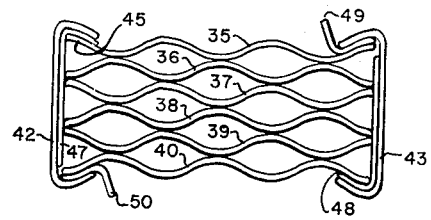

Fig. 5 shows an additonal variation of the species of Fig. 4 where the alternate corrugated plates 35 through 40 meet in a honeycomb fashion, again maintaining their own spacing and contact with succeeding plates. Since there are no spacers to maintain in constant orientation with the plates, other means of binding the plates such as that shown in Fig. 5 could be used. Here, metal brackets 42 and 43 are folded or slid over the corrugations, which may be oriented so that an outwardly turning ledge such as 45 is presented at each edge.

These metal brackets should of course be separated from at least one surface by insulation 47 and 48. This should be extended along the bracket to avoid shorting of any of the intermediate plates.

If one end of each bracket is left in contact with an outer surface of one of the plates that bracket can serve as a terminal. Terminal lugs, 49 and 50 for the rectifier could be attached to the bracket, or the rectifier could be clipped into a socket somewhat like a fuse holder.

Other variations of this invention will be apparent to those skilled in the art from the foregoing description.

What is claimed is:

1. A metallic rectifier comprising two metallic plates each having one side coated with a rectifying compound, said plates mounted in a stack with the one side of one of said plates electrically connected to the other side of the adjacent plate, one of said plates being corrugated, and terminals for said rectifier in contact with the two outer surfaces of the stack.

2. A metallic rectifier comprising at least one metallic plate coated on one side with a rectifying compound, said metallic plate being corrugated to increase the heat dissipation of the rectifier for a given size, and having a terminal in contact with said metallic plate and a terminal in contact with said compound.

3. A metallic rectifier comprising a plurality of corrugated plates, said plates coated on one side with a rectifying compound, a plurality of metallic spacers of a smaller surface area than said plates, said plates formed in a flat stack with said coated sides in the same direction and interspaced with said metallic spacers, means for securing said plates and said spacers in said flat stack, and terminal lugs in contact with the outer opposing surfaces of said stacks.

4. A metallic rectifier as in claim 3, wherein said means for securing said plates comprises; a bolt extending through each of said plates and spacers, and insulated therefrom, and a nut cooperating with said bolt to close said stack.

5. A metallic rectifier as in claim 4, wherein said plates are substantially circular and said corrugations are circular and concentric about said bolt.

6. A metallic rectifier as in claim 4, wherein said plates are substantially circular, said bolt is centrally located, and said corrugations extend radially outward from said bolt.

7. A metallic rectifier as in claim 4, comprising corrugated metallic plates of the same size and configuration, coated on one side with a selenium compound, each of said plates having an opening near its center, through a ridge in said corrugation, metallic washers of the same corrugation as that of said plates about said openings, one of said washers mounted between each of said plates, said bolt extending through said openings.

8. A metallic rectifier comprising a plurality of corrugated plates having one surface coated with rectifying compound, a flat surface centrally located on each of said plates, a plurality of flat metallic washers, a bolt for mounting said plates and washers, said flat surface having a hole to receive said bolt, said plates mounted on said bolt with said coated surfaces in one direction, said washers mounted between said plates, a nut cooperating with said bolt to secure said plates and washers, said nut and bolt electrically insulated from said plates and washers.

9. A metallic rectifier comprising a plurality of metallic plates having one surface coated with selenium, said plates stacked with the coated surface of one plate next to an uncoated surface of the adjacent plate, corrugations in said plates, said adjacent plates in contact only along the ridges of said corrugations, whereby substantial spacing is maintained between the greater part of said adjacent plates, and means for securing said plates together.

10. A metallic rectifier as in claim 9, wherein the adjacent plates in said stack are alternately flat and corrugated.

11. A metallic rectifier as in claim 9, wherein the adjacent plates are corrugated with uniform ridges and valleys, and the coated ridges of one plate are in continuous contact with the uncoated valleys of the adjacent plate.

12. In a metallic rectifier as in claim 9, said means for securing said plates comprising a bracket having a first ledge engaging the uppermost plate in said stack, and a second ledge engaging the lowermost plate in said stack, said bracket making electrical contact with not more than one surface of one of said plates.

13. A metallic rectifier as in claim 12, having at least two brackets, one ledge of a first of said brackets retaining a first terminal lug in electrical contact with the outer surface of the uppermost plate in said stack, and one ledge of a second of said brackets retaining a second terminal lug in electrical contact with the outer surface of the lowermost plate in said stack.

14. A metallic rectifier as in claim 12, having at least two brackets of metallic composition, one ledge of a first bracket making electrical contact with the outer surface of the uppermost plate, and one ledge of a second bracket making electrical contact with the outer surface of the lowermost plate.

15. A metallic rectifier comprising a plurality of metallic plates having one side coated with a rectifying substance, at least one of said plates having a corrugated structure, said plates mounted in a stack with one side of each of said plates electrically connected to the other side of the adjacent plates.

References Cited in the file of this patent

UNITED STATES PATENTS

| Number | Name | Date |
|---|---|---|
| 1,738,113 | Ogden | Dec. 3, 1929 |
| 2,316,553 | Brunke | Apr. 13, 1943 |
| 2,328,488 | Peters | Aug. 31, 1943 |
| 2,388,532 | De Lange et al. | Nov. 6, 1945 |
| 2,416,152 | Braun | Feb. 18, 1947 |
| 2,474,809 | Abbott | July 5, 1949 |
| 2,489,767 | Fennema et al. | Nov. 29, 1949 |